United States Patent [19]

Hanscom et al.

[11] Patent Number: 4,598,171
[45] Date of Patent: Jul. 1, 1986

[54] VOICE OPERATED TELEPHONE ANSWERING SYSTEM

[75] Inventors: Bradford E. Hanscom, Downey; Gerald L. Mock, Corona, both of Calif.

[73] Assignee: Fortel Corporation, Compton, Calif.

[21] Appl. No.: 531,461

[22] Filed: Sep. 12, 1983

[51] Int. Cl.$^4$ .............................................. H04M 1/64
[52] U.S. Cl. ................................................ 179/6.14
[58] Field of Search .................... 179/6.01, 6.14, 6.15, 179/6.16; 369/53

[56] References Cited

U.S. PATENT DOCUMENTS 3,688,043  8/1972  Konno ................................. 179/6.14
3,865,986  2/1975  Darwood ........................ 179/6.14 X
3,881,061  4/1975  Ando ................................... 179/6.14
3,935,390  1/1976  Winterhalter ....................... 179/6.14
3,941,934  3/1976  Bonsky ............................... 179/6.14

Primary Examiner—Robert L. Richardson
Attorney, Agent, or Firm—Keith D. Beecher

[57] ABSTRACT

A telephone answering system in which the calling party may record a message of any length within the recording capabilities of the message tape, and is not limited to any predetermined message time interval. The system is controlled by a microcomputer, and includes circuitry such that the microcomputer only responds to actual voice signals, so that the message recording interval is terminated when the calling party stops talking for a particular time interval, regardless of whether a tone signal or a busy signal then appears on the telephone line.

2 Claims, 3 Drawing Figures

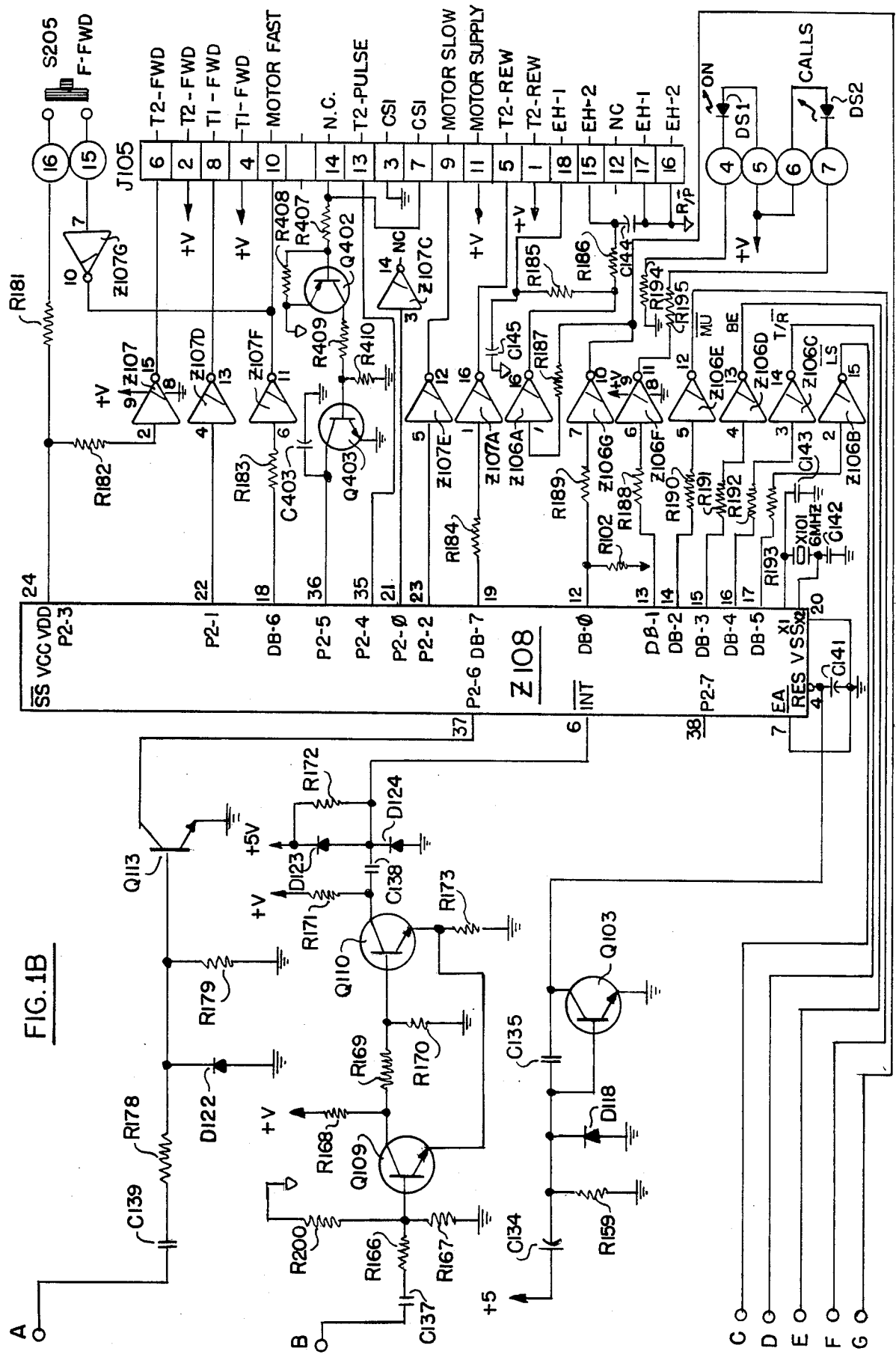

VOICE OPERATED TELEPHONE ANSWERING SYSTEM

BACKGROUND OF THE INVENTION

The invention is concerned with a telephone answering system which includes a sensing circuit which responds to a ring signal on the telephone line to activate the system. When the system is so activated, a recorded announcement is transmitted over the telephone line to the calling party during a time interval ($T_1$). A message recording tape is then activated in order that the calling party may record his message during a subsequent time interval ($T_2$). In the system of the invention, the message recording equipment is voice actuated, so that the calling party is not limited to any particular prescribed time interval ($T_2$) in which to record his message. So long as the calling party continues talking, the message is recorded up to the capabilities of the recording apparatus.

Voice actuated telephone answering systems are known to the art. However, problems have arisen in the prior art systems in that, for the most part, such systems were incapable of handling a situation in which the calling party hung up, without recording any message. When the calling party hangs up, usually a dial tone signal or a busy signal then appears on the telephone line, and the prior art voice actuated telephone answering systems had a tendency, instead of deactivating the recording process to continue to record the busy signal or the tone signal for the entire length of the recording tape, thereby wasting the entire unused portion of the tape.

In an attempt to solve the problem, telephone answering systems have been conceived in the past which, for example, respond to potential changes on the line when the calling party hangs up, in order to deactivate the telephone answering systems. However, such systems are not effective to deactivate themselves in the event the calling party hangs up during the announcement interval ($T_1$), when the system is not responding to incoming signals but is transmitting an announcement over the telephone line to the calling party.

Other systems have been conceived in the past which respond, for example, to a silence or a dial tone on the telephone line, following a hang-up by the calling party to deactivate themselves. However, many telephone systems automatically produce a busy signal on the telephone line a predetermined time interval after the calling party has hung up. Accordingly, a situation can arise where the calling party hangs up during the announcement interval ($T_1$) of a telephone answering system, for the system to encounter a busy signal on the telephone line when it switches itself to the message recording mode ($T_2$). Most prior art voice operated telephone answering systems are incapable of distinguishing the received busy signal from normal voice signals, and this results in the busy signal being recorded during the remaining length of the message recording tape, and thereby wasting the message tape.

The voice operated telephone answering system of the present invention is constructed so that when the system enters the message recording mode ($T_2$), at the end of the announcement interval ($T_1$), it will remain activated only so long as the system actually receives a human voice. Should the calling party hang up at any time during the announcement interval ($T_1$), or during the message interval ($T_2$), so that a silence, a dial tone, or a busy signal occurs on the telephone line at the beginning or during the message interval ($T_2$), the system of the invention will deactivate itself thereby stopping the message tape.

BRIEF DESCRIPTION OF THE DRAWING

FIGS. 1A and 1B represent a schematic circuit diagram of a microcomputer controlled telephone answering system incorporating the concepts of the present invention, in one of its embodiments.

DETAILED DESCRIPTION OF THE ILLUSTRATED EMBODIMENT

Figure 1A:
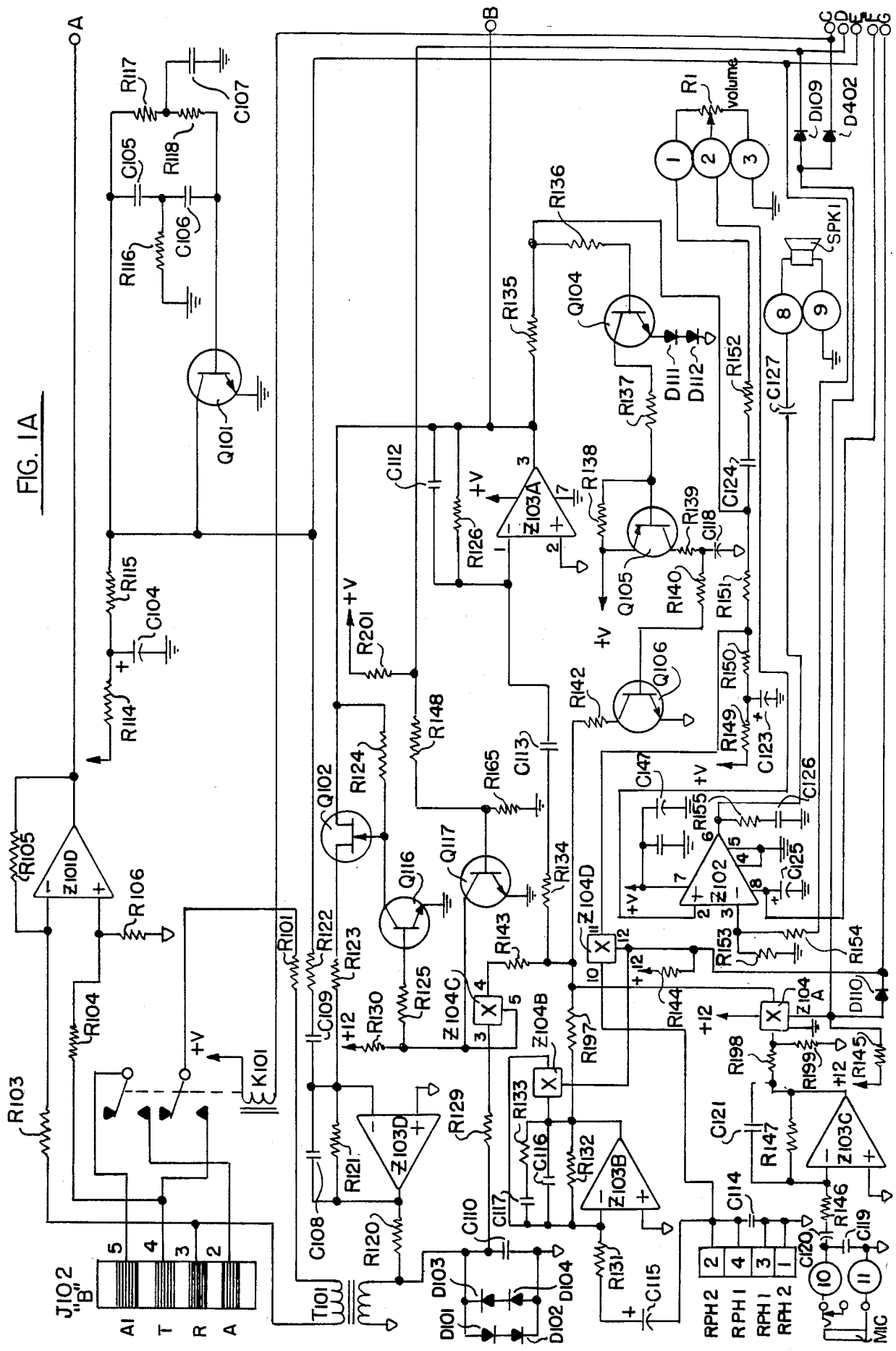

The system shown in FIGS. 1A and 1B includes a microcomputer Z108 which may be of the type manufactured and sold by National Semiconductor Company, and which is designated by them as INS8048. The system also includes a connector J102 which has terminals 3 and 4 connected to the tip and ring terminals of the telephone line. Line seizure is effectuated by a relay K101. The system is coupled to the telephone line through a transformer T101. The outgoing audio corresponding to the announcement transmitted by the system during the announcement interval ($T_1$) is amplified by an amplifier Z103D. The incoming audio signals to be recorded during the message interval ($T_2$) are amplified by an amplifier Z103A. A connector J103 is connected to the record and reproduce head RPH2 associated with the T-2 message tape, and to the record and reproduce head RPH1 associated with the T-1 announcement tape.

The incoming audio signals representing the message to be recorded are passed through transformer T101 and through a bilateral analog switch Z104C to amplifier Z103A, and through a bilateral analog switch Z104D to the record/reproduce head RPH2 to be recorded on the message tape T-2. Resistors R149, R150 and R151, together with grounded capacitor C123 provide a bias circuit for the head. An automatic gain control circuit for amplifier Z103A is provided by transistors Q104, Q105 and Q106. The announcement recorded on the announcement tape T-1 is amplified by amplifier Z103B, and through amplifier Z103A and amplifier Z103D to transformer T101 for introduction to the telephone line. The incoming audio signals may also be reproduced by speaker SPK-1, after being amplified by amplifier Z102. The volume of the reproduced signals may be controlled by potentiometer R1.

Audio signals representing local dictation may be recorded on the message tape T-2 by a microphone introduced to jack MIC, such signals being amplified by amplifier Z103C and passed through bilateral switch Z104 to the record/reproduce heads RPH2 associated with the T-2 tape.

The ring signal for the telephone answering system of FIGS. 1A and 1B is initiated when a ring signal occurs at the tip (T) and ring (R) terminals of terminal strip J102. The ring signal is fed to an operational amplifier Z101D. The alternating current output of amplifier Z101D is fed to port P2-6 of microcomputer Z108, by way of a differentiator circuit formed by capacitor C139, resistor R178, diode D122, resistor R179 and transistor Q113. The microcomputer decides whether or not the alternating current output of amplifier Z101D is of proper duration (>400 milliseconds) and amplitude (>20 VRMS), and if so activates the T-1 cycle when the ring signal count matches the count set by the ring select switch S203. Ring select switch S203 can be set to cause the system to respond to a selected number of rings before activation, according to the setting of the switch.

When the microcomputer Z108 recognizes the preset ring count, it initiates a T-1 cycle. The T-1 cycle activates the T-1 announcement tape, causes the telephone line to go off hook, and plays the announcement recorded on the announcement tape over the telephone line. For this purpose, microcomputer Z108 activates port P2-2 which turns on a motor (M1) at its regulated speed (motor slow) by way of driver Z107E, and terminal J105-9. Port P2-1 of the microcomputer is turned on at this time to activate the T-1 forward solenoid. This action in conjunction with the activation of motor M1 pulls in the T-1 head plate and starts the T-1 tape moving. At the same time, port DB-5 of the microcomputer Z108 goes high (1), and its output is fed to an inverting amplifier driver Z106B, whose output LS is at ground potential. This activates relay K101 which puts transformer T101 and resistor R101 across the tip and ring terminals of strip J102, providing a line seize (off-hook) condition. Port DB-4 of the microcomputer goes low (0) at this time, and its output is inverted by inverter Z106C providing a high (1) potential at its output (T/R). This high (1) potential is fed to the base of transistor Q117 to render the transistor conductive. When transistor Q117 is conductive, it permits the bistable analog switch Z104C to be opened.

Audio signals corresponding to the audio announcement recorded on the moving T-1 tape are picked up by record head RP-1 and fed by way of capacitor C115 and resistor R113 to amplifier Z103B. The audio signals are amplified by a gain of approximately 200, and fed to amplifier Z103A by way of resistors R197 and R134, and capacitor C113. The audio signals are amplified in amplifier Z103A by a gain of approximately 100, and is fed to transistor Q102 which is biased to its conductive state by resistor R124. So long as transistor Q116 is non-conductive, the announcement audio signals are passed through transistor Q102 to amplifier Z103D, from which they are fed to the line transformer T101. The line transformer transmits the outgoing audio announcement signals to the telephone line.

The audio level is controlled by the automatic gain control circuit of transistors Q104, Q105 and Q106. When the AGC signal fed to the base of Q104 goes above 3.6 volts, the transistor is rendered conductive. The 1.8 bias level for transistor Q104 is set by the voltage drop across diodes D111 and D112. Transistor Q105 will become conductive when its base potential is lowered, allowing capacitor C114 to charge. If capacitor C114 charges sufficiently, it renders transistor Q106 conductive by way of resistors R140 and R141. Q106 provides a variable impedance that operates in conjunction with resistor R197 to adjust the audio level of transistor Z103 downwardly.

At this time, port DB-2 of microcomputer Z108 is turned on, and its output is fed to inverter Z106E where it is inverted. The resulting low potential (0) is applied to the amplifier Z102 to cause the speaker SPK-1 to be muted.

The audio output from Z103A is also fed to an audio squaring circuit which includes a Schmitt trigger formed of transistors Q109 and Q110 by way of capacitor C137 and resistor R166. The squared audio signal from the collector of Q110 is fed to a differentiator circuit formed by capacitor C138 and resistor R172. The resulting negative-going spikes are interrogated by microcomputer Z108 to detect a beep tone (1530 Hz–2070 Hz) which is recorded on the T-1 announcement tape, and which signals the end of the T-1 announcement. When the beep tone recorded on the T-1 tape is recognized, the microcomputer turns off port P2-1 which releases the T-1 forward solenoid. This action causes the T-1 head plate to retract, and stops the T-1 tape.

The message recording cycle ($T_2$) begins when the beep tone on the announcement tape (T-1) is recognized by the microcomputer Z108. When the message recording cycle ($T_2$) begins, the message tape T-2 is activated to permit the recording of the message received from the calling party over the telephone line for the length of the time specified by the setting of a message time switch (not shown). When the message switch is in a "VOX" position, the message received over the telephone line will continue to be recorded on the message tape T-2 for so long as the calling party continues to talk, up to the capabilities of the message tape. Specifically, the machine will continue to record the message until there is a 7 second break in the audio signal, or a dial tone is encountered, or a busy signal is encountered, or a pulse due to the calling party hanging up occurs.

The VOX interrogation of the incoming audio signal is controlled by the microcomputer Z108. The external circuitry necessary for this function is a squaring circuit including a Schmitt trigger formed by transistors Q109 and Q110 which digitizes the audio information. Once the microcomputer has determined that no audio is present, or that a spurious audio signal is present, the microcomputer will output a beep tone to the tape heads and to the telephone line. The T-2 message tape will now rewind an amount corresponding to the 7 second time-out, and the T-2 tape will then be disengaged. The system will then transfer to the T-1 announcement tape, and rewind the T-1 announcement tape to its origin position, and await the next call.

When the beep tone recorded on the T-1 announcement tape is recognized by the microcomputer Z108, its sets the port P2-1 low (0) which disengages the T-1 forward solenoid. The motor (M1) remains on by way of port P2-2. Port P2-3 is then made high (1), and its output, after inversion by inverter Z107B energizes the T-2 play solenoid. This action, in conjunction with the activation of motor M1 engages the T-2 head plate causing the T-2 message tape to move in the forward direction. The system now enters its $T_2$ cycle, during which port DB-5 remains high (1) maintaining line seizure.

The audio signals from the telephone line are fed into the system when the microcomputer Z108 causes port DB-4 to go high (1), the output being inverted by inverter Z106C causing its output T/R to go low (0). When T/R goes low, Q117 becomes non-conductive to allow voltage from resistor R130 to turn on bilateral switch Z104C in a unidirectional audio circuit. When switch Z104C is turned on, it permits the audio signal from the telephone line to be passed to operational amplifier Z103A in a unidirectional audio circuit by way of transformer T101, R127, R129, Z104C, Z143, R134 and C113 which are also included in the unidirectional audio circuit. Amplifier Z103 feeds audio signals to the heads RPH2 of the T-2 message tape by way of resistors R135 and R151, bilateral analog switch Z104D and connector J103-2. Resistors R149 and R150, and capacitor C123 provide a 6 volt DC bias to transistor Q106. Analog switch Z104D is turned on at this time by the microcomputer Z108 causing port DB-0 to go low (0), and output R/P to go high (1), so that audio may be applied to the T-2 heads RPH2. The amplifier Z103B is disabled at this time, because analog switch Z104B is also turned on.

The recording level of the incoming message on the T-2 message tape is controlled by the AGC circuit of transistors Q104, Q105 and Q106, as described above.

The T-2 message tape will be erased before the new message is recorded, because the port DB-0 is low (0) causing the output of Z106G to go high, which in turn causes the output of Z106A to go low, causing current flow through the EH-2 erase head.

Outgoing audio is inhibited during the T-2 record cycle because Q117 is rendered non-conductive. The voltage provided by R130, which is inhibited by Q117 when it is conductive, will feed Q116 by way of resistor R125 causing Q116 to become conductive. When Q116 becomes conductive, it turns off Q102, breaking the outgoing audio path to the telephone line.

The incoming audio from Z103A is also fed to Z102 by way of capacitor C124, resistor R152, and volume control potentiometer R1. Z102 amplifies the audio and feeds it to speaker SPK-1 by way of capacitor C127. The muting on Z102 was previously removed by the microcomputer setting the port DB-2 low (0), which allows the output (MU) of inverter Z106E to go high (1). With (MU) high, Z102 no longer inhibits the audio signal, so as to enable monitoring of incoming calls.

The voice control for recording messages (VOX) is achieved by the microcomputer Z108 in response to the digitized audio signal presented at port INT by the Schmitt trigger Q109 and Q110 of the audio squaring circuit. Audio signals are fed to the base of Q109 by way of capacitor C137 and resistor R166. Resistors R200 and R167 set the audio level for the Schmitt trigger. Square-wave pulses are fed from Q110 to differentiator C138, R172 at a very high amplitude, and are reduced to 5 volt negative-going pulses for the microcomputer. These pulses are interrogated by the program of the microcomputer to meet VOX specifications. When they no longer meet VOX specifications, or if a CPC (calling party hang-up control) pulse occurs, port DB-5 goes low, causing the output LS of inverter Z106B to go high. When LS goes high, the K-101 relay is released, and this removes line seizure from the telephone line. Port P2-3 will then go low releasing the T-2 forward solenoid causing the message tape to stop; port DB-7 will go high (1) activating the T-1 1 rewind solenoid; and the announcement tape will go into its rewind operation until port DB-7 goes low (0) releasing the T-1 rewind solenoid causing the announcement tape to rewind to its origin position and stop.

The beep tone oscillator of transistor Q101 is activated when the microcomputer Z108 causes port DB-3 to go low (0), at which time the output (BE) of Z106D will go high (1). So long as the output (BE) is high, the beep oscillator oscillates and generates a beep signal. The beep oscillator of transistor Q101 is a "twin T" oscillator circuit whose output frequency is approximately 1800 Hz. The beep signal continues for about one second, and is fed to amplifier Z103D by way of resistor R122 and capacitor C109. Z103D introduces the amplified beep signal to the telephone line by way of resistor R120 and transformer T101. The beep signal is also fed through switch Z104C to amplifier Z103A to be recorded on the T-2 tape.

At the end of the $T_2$ message recording interval, port P2-3 goes low releasing the T-2 head tape. Port P2-0 will then go high (1) activating the announcement T-1 rewind solenoid. This causes the announcement tape T-1 to rewind to its origin position. When that position is reached, no more S1 pulses are received at port P2-5 and the microcomputer terminates the rewind operation and sets the system in condition to accept the next call.

The ideal Vox system would be able to discriminate between "voice" signals and "non-voice" signals (e.g. busytone, dialtone, error tone, etc.) that appear on a normal telephone line. The Vox system of this invention approaches this ideal. The Vox system of the invention encompasses:

1. A tel-line interface circuit
2. A unidirectional audio circuit
3. An audio squaring circuit
4. A microcomputer containing the Vox algorithm.

1. Tel-Line Interface Circuit:

The tel-line interface circuit may be of the type as shown in FIG. 1A. In this circuit, audio signals from the tel-line are coupled to the audio circuit by transformer (T101).

2. Unidirectional Audio Circuit:

The unidirectional audio circuit as shown in FIG. 1A is comprised of components Z104C (bilateral switch), Z103A (operational amplifier), and associated passive components R129, R143, R134, R126, C113 and C112.

3. Audio Squaring Circuit:

The audio squaring circuit as depicted in FIG. 1B is composed of transistors Q109 and Q110 connected in a manner with associated passive components R166, R187, R200, R168, R169, R170, R171, R172, C137, C138, C123 and D124 to produce a "Schmitt trigger" and differentiator. Thus audio signals from the audio circuit with sufficient amplitude to overcome the fixed bias provided by R167 and R200 will appear at the INT port of the microcomputer Z108 as a negative-going "pulse" waveform.

Figure 2:
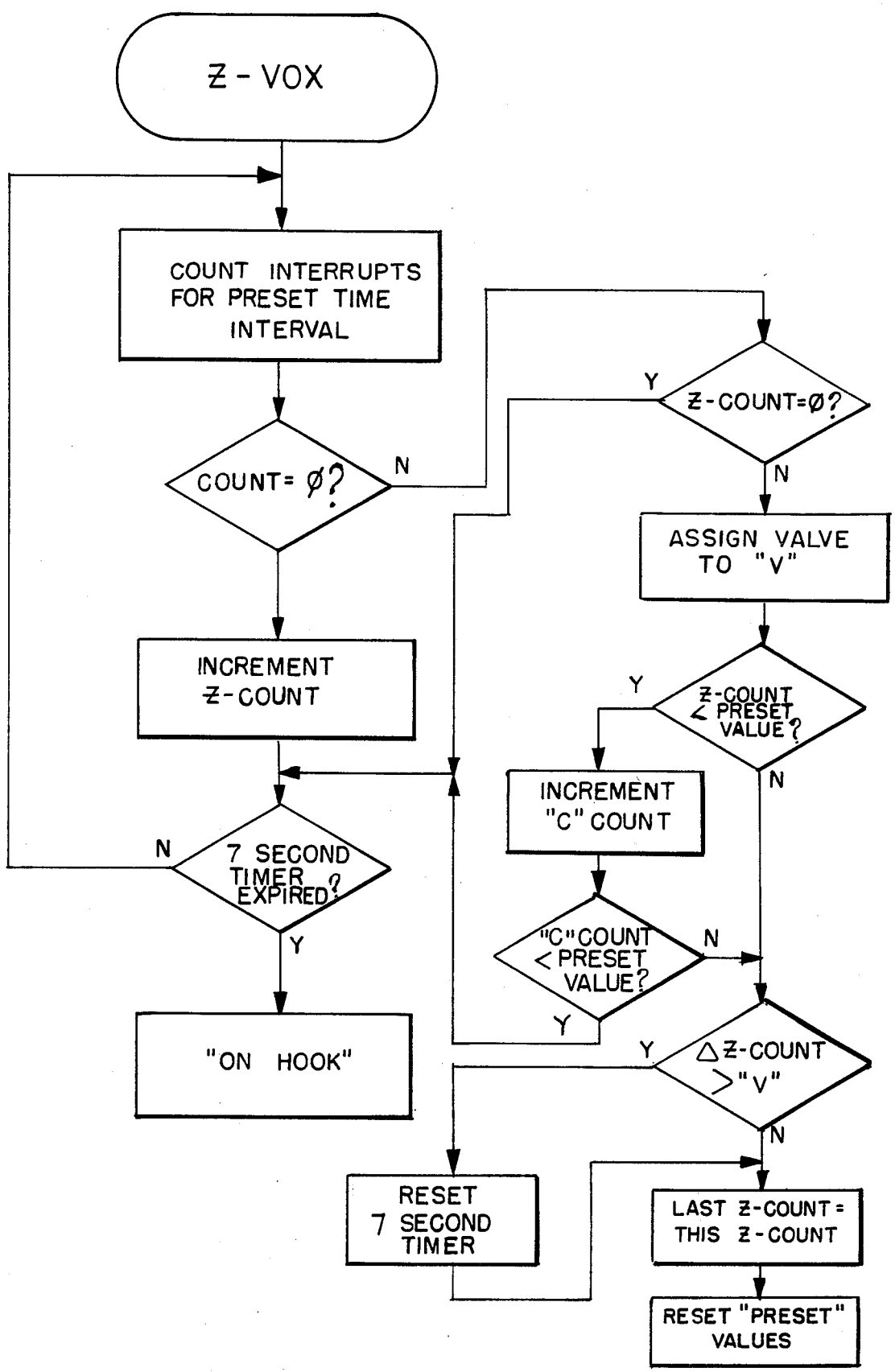
FIG. 2 is a flow chart representing the algorithm for the microcomputer.

4. The Microcomputer Algorithm:

The "Z-Vox" algorithm as shown in FIG. 2 functions as follows:

Pulses from the "audio squaring" and differentiator circuit cause the microcomputer to be interrupted. Each time an "interrupt" occurs within a fixed time window a memory register (T-count) will be incremented. At the end of the preset window time, the register (T-count) will be examined. If the number in the register "T-count" is $\geq 3$ another register (Z-count) will be incremented. The 7 second timer will now be examined, and if found equal to zero, the microcomputer will command the machine to go "on hook".

If the number in register "T-count" is greater than 2 and register "Z-count" is greater than zero the program flow will be such that a variable "V" will be assigned a specific value based on the two aforementioned registers. If register "Z-count" is less than a preset value, register C-count will be incremented and (if last "Z-count" is less than a preset value) the program flow will be directed to the 7 second timer check as indicated above. If either "C-Count" or "Z-count" are equal to or greater than their preset values, the mathematical difference of the value of the last "Z-count" and this "Z-count" will be compared to preset variable "V". If "V" is less than this difference, the 7 second timer will reset. Regardless of the values or "C-count" and "Z-count", "Last Z-count" will now be set equal to "This Z-count" and all other variables will be initialized. Program flow can now move back to the beginning of the algorithm.

The basic concept of the Vox system of the invention is to differentiate between voice and non-voice signals by examining the length of each period of silence. Signals such as dial tone and error tone have no silent periods (as they are continuous wave signals) and thus fail the algorithm. Signals such as busy tone have silent periods that are regular but may contain aberations. These aberations if present are trapped by the variables "V" and "C" as indicated on the flow chart (FIG. 2). Thus busy tones whether regular or irregular will fail the algorithm. Because voice signals are very aperiodic they will always pass the algorithm.

The following circuit values were used in the system of FIG. 1, and these are listed merely by way of example, and are not intended to limit the invention in any way:

| | |
|---|---|
| R120 | 620 ohms |
| R121 | 22 kilo-ohms |
| C108 | 1880 picofarads |
| C109 | 0.01 microfarads |
| R122 | 62 kilo-ohms |
| R123 | 24 kilo-ohms |
| R124 | 1 megohm |
| R125 | 47 kilo-ohms |
| R130 | 10 kilo-ohms |
| R148 | 100 kilo-ohms |
| R201 | 10 kilo-ohms |
| R126 | 1 megohm |
| R129 | 5.6 kilo-ohms |
| C110 | 2200 picofarads |
| R143 | 5.6 kilo-ohms |
| R134 | 3.9 kilo-ohms |
| R165 | 47 kilo-ohms |
| C112 | 47 picofarads |
| C113 | 0.1 microfarad |
| R135 | 100 ohms |
| R136 | 4.7 kilo-ohms |
| R137 | 10 kilo-ohms |
| R138 | 47 kilo-ohms |
| R139 | 1 kilo-ohm |
| R140 | 22 kilo-ohms |
| R141 | 22 kilo-ohms |
| R142 | 100 ohms |
| C118 | 47 microfarads |
| R197 | 5.6 kilo-ohms |
| R133 | 300 kilo-ohms |
| R131 | 4.7 kilo-ohms |
| R132 | 1 megohm |
| C116 | 220 picofarads |
| C117 | 2200 picofarads |
| C115 | 1 microfarad |
| R149 | 4.7 kilo-ohms |
| C123 | 10 microfarads |
| R150 | 16 kilo-ohms |
| R151 | 3.9 kilo-ohms |
| C124 | 0.01 microfarads |
| R152 | 220 kilo-ohms |
| R1 | 10 kilo-ohms |
| C147 | 10 microfarads |
| C148 | 0.1 microfarads |
| C127 | 47 microfarads |
| C125 | 10 microfarads |
| C126 | 0.1 microfarads |
| R153 | 330 ohms |
| R154 | 220 kilo-ohms |
| R155 | 10 ohms |
| R144 | 4.7 kilo-ohms |
| R145 | 10 kilo-ohms |
| R146 | 1 kilo-ohm |
| R147 | 100 kilo-ohms |
| R198 | 5.6 kilo-ohms |
| R199 | 5.6 kilo-ohms |
| C114 | 1000 picofarads |
| C119 | 2200 picofarads |

-continued

| | |
|---|---|
| C120 | 1 microfarad |
| R101 | 150 ohms |
| R114 | 1 kilo-ohm |
| R115 | 10 kilo-ohms |
| R116 | 9.1 kilo-ohms |
| R117 | 39 kilo-ohms |
| R118 | 39 kilo-ohms |
| C104 | 33 microfarads |
| C106 | 2200 picofarads |
| C107 | 0.01 microfarads |
| C137 | 0.1 microfarad |
| C139 | 10 microfarads |
| R166 | 10 kilo-ohms |
| R167 | 33 kilo-ohms |
| R168 | 18 kilo-ohms |
| R169 | 12 kilo-ohms |
| R170 | 4.7 kilo-ohms |
| R171 | 10 kilo-ohms |
| R172 | 330 kilo-ohms |
| R173 | 390 ohms |
| R200 | 150 kilo-ohms |
| C138 | 100 picofarads |
| R178 | 4.7 kilo-ohms |
| R179 | 10 kilo-ohms |
| R159 | 10 kilo-ohms |
| C134 | 10 microfarads |
| C135 | 0.1 microfarads |
| C141 | 1 microfarad |
| C142 | 33 picofarads |
| C143 | 33 picofarads |
| R188 | 3 kilo-ohms |
| R189 | 3 kilo-ohms |
| R190 | 3 kilo-ohms |
| R191 | 3 kilo-ohms |
| R192 | 3 kilo-ohms |
| R193 | 3 kilo-ohms |
| R194 | 1.5 kilo-ohms |
| R195 | 1.5 kilo-ohms |
| R102 | 3 kilo-ohms |
| R183 | 3 kilo-ohms |
| R184 | 3 kilo-ohms |
| R185 | 200 ohms |
| R186 | 200 ohms |
| R187 | 47 kilo-ohms |
| C144 | 100 microfarads |
| R407 | 10 kilo-ohms |
| R408 | 10 kilo-ohms |
| R409 | 10 kilo-ohms |
| R410 | 10 kilo-ohms |
| R181 | 3 kilo-ohms |
| R182 | 3 kilo-ohms |
| R180 | 22 kilo-ohms |
| C403 | 10 microfarads |
| C145 | 100 microfarads |
| R103 | 22 megohms |
| R104 | 22 megohms |
| R105 | 560 kilo-ohms |
| R106 | 560 kilo-ohms |

The invention provides, therefore, a telephone answering system which includes a voice operated circuit for permitting a calling party to record his message so long as he continues to talk. The system of the invention includes a microcomputer and associated circuitry which determines immediately the absence of a true audio signal, so as to terminate the $T_2$ message recording cycle.

It will be appreciated that while a particular embodiment of the invention has been shown and described, modifications may be made. It is intended in the claims to cover all modifications which come within the true spirit and scope of the invention.

What is claimed is:

1. In a telephone answering system which responds to telephone messages received over a telephone line and which causes a recorded announcement to be transmitted over the telephone line to a caller during a first time interval in response to a telephone call, and which includes a magnetic tape mechanism for recording messages received over the telephone line during a second time interval following the first time interval; the combination of: a microcomputer; an input circuit adapted to be coupled to the telephone line for receiving audio signals therefrom during the second time interval representing a message from a caller and for recording the audio signals on the magnetic tape mechanism; an output circuit adapted to be coupled to the telephone line for transmitting to a caller during the first time interval audio signals representing the announcement; circuit means connecting a first port of the microcomputer to the magnetic tape mechanism to cause the magnetic tape mechanism to record the audio signals received from said input circuit so long as the output of said first port has a first predetermined value and to stop when the output of said first port assumes a second predetermined value, further circuit means connected to said input circuit for digitizing the audio signals received from said input circuit; a differentiating circuit connected to said further circuit means for transforming the digitized audio signals into a series of pulses time-spaced from one another, said microcomputer causing said output of said first port to assume said first predetermined value so long as the time intervals between successive ones of said pulses are aperiodic, and causing said first port to assume said second predetermined value to stop said magnetic tape mechanism when the time intervals between successive ones of said pulses indicate that said input circuit is no longer receiving audio signals from said telephone line.

2. The combination defined in claim 1, in which said further circuit means includes a Schmitt trigger.

* * * * *